UNITED STATES PATENT OFFICE.

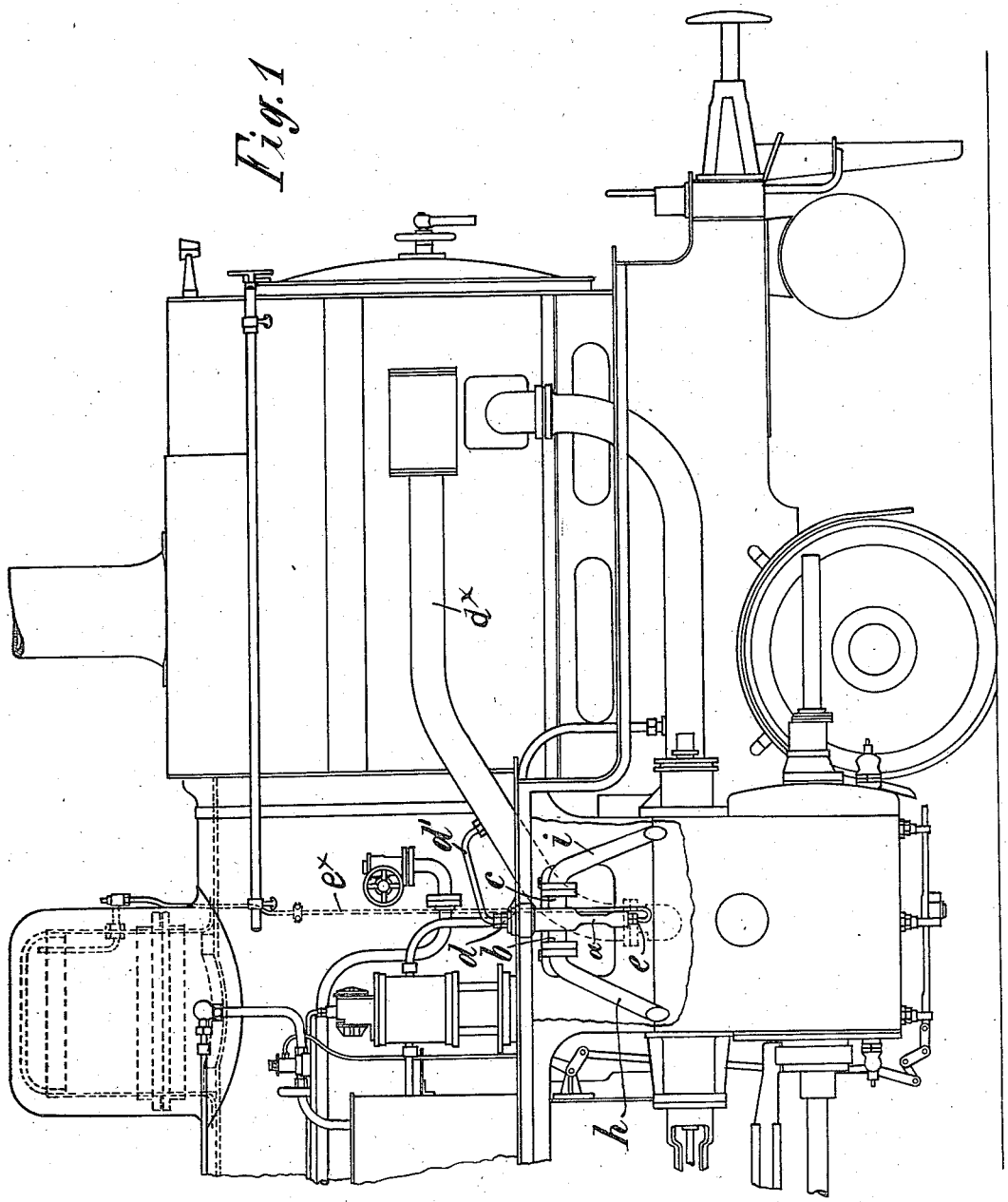

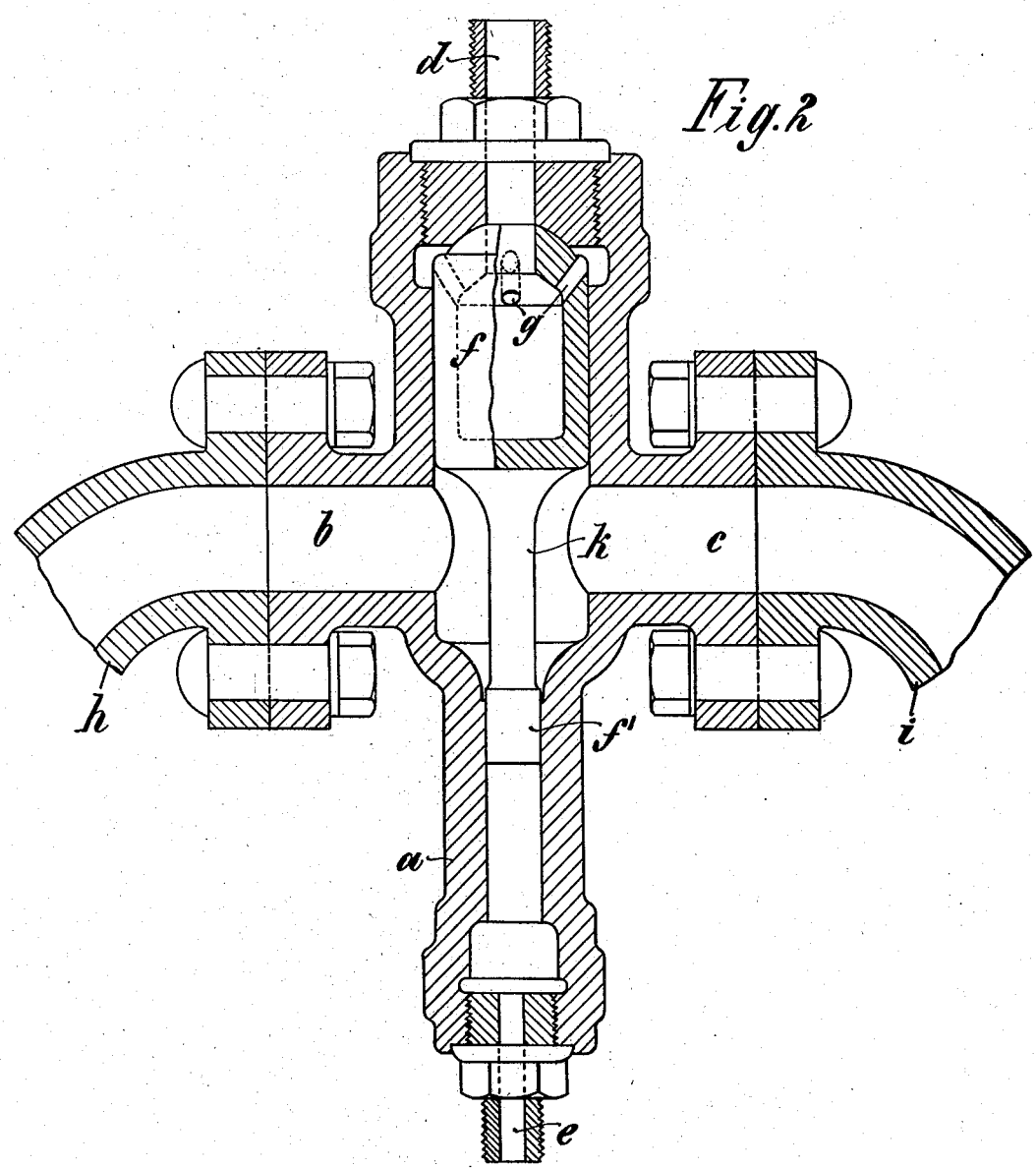

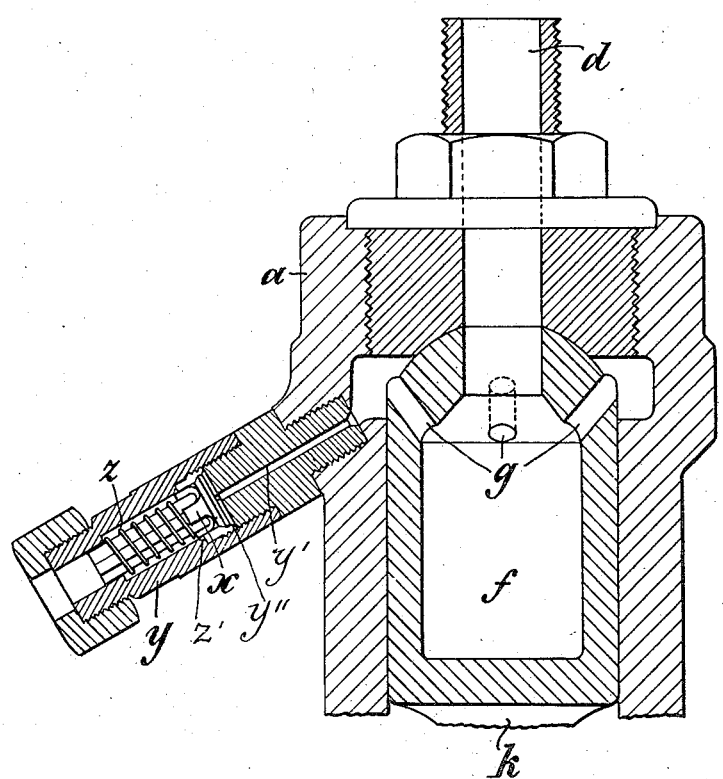

GEORG HÖHNER, OF BERLIN, GERMANY.

LOCOMOTIVE.

No. 911,407.　　　Specification of Letters Patent.　　　Patented Feb. 2, 1909.

Application filed June 22, 1908. Serial No. 439,830.

*To all whom it may concern:*

Be it known that I, GEORG HÖHNER, a subject of the King of Prussia, and resident of Berlin, Prussia, Germany, have invented Improved Means for Automatic-Pressure Compensation in Locomotives, of which the following is a description.

My invention relates to locomotives, and particularly to means for preventing the cushioning effect between the piston and the cylinder when steam is cut off and it is desired that the engine should drift freely.

The invention consists in the features, combination and arrangement of parts herein described and particularly pointed out in the claims.

In the accompanying drawing, Figure 1 is a side view of a part of a locomotive with my invention applied thereto. Fig. 2 is a sectional view through the valve forming part of my invention. Fig. 3 is a detail view showing a portion of the valve and an automatic relief valve therefor.

In these drawings $a$ is the casing of the valve forming a part of my invention, and $b$ and $c$ are flanged sockets on the said valve casing. To these sockets pipes $h$ and $i$ connect, the said pipes being also connected with the front and rear steam channels of the cylinder of the engine, in which the piston operates.

$d$ is a flanged socket and $d'$ is a steam supply pipe leading thereto, said steam supply pipe connecting with a main steam supply pipe $d^{\times}$, which supplies the steam power to the piston and cylinder.

$e$ is another flanged socket on the valve casing which connects through a pipe $e^{\times}$ with the dry steam casing or dome, as shown in Fig. 1. Within the valve casing $a$ there is provided a piston valve comprising the piston members $ff'$ connected by a rod $k$. The function of this piston valve is to cut off communication between the pipes $h$ and $i$, or to permit said communication to exist according to whether the engine is to be operated under steam pressure or to drift. When steam is being supplied to the cylinder and piston, steam pressure will also be supplied through the pipe $d'$ to the upper face of the piston $f$, and this will be forced down to obstruct the passage through the pipes $h$ and $i$, this being effected by the piston $f$ shutting off the ports or passages $b$, $c$, by assuming a position across the inner ends of these passages. Under this condition the engine will work in the ordinary manner under the pressure of the steam, because the valve $f$ cuts off communication between the steam channels at the front and rear of the cylinder. When, however, steam is cut off from the cylinder by the throttle valve, which as in ordinary practice will cut off the steam pressure through the pipe $d^{\times}$, no steam pressure will be supplied to the upper end of the piston valve $f$, and consequently the lower piston valve $f'$ will be under pressure of steam through the pipe $e^{\times}$ and the socket $e$, and this will force the piston $f'$ upwardly, and consequently the piston $f$ will also rise, thus leaving free communication existing between the passages $b$ and $c$ and therefore between the steam channels at opposite ends of the cylinder through the pipes $h$ and $i$. Under these conditions air or steam in the cylinder will be free to pass back and forth from one end to the other through pipes $h$ and $i$ and the engine will thus be allowed to drift without resistance being offered thereto by any cushioning action of the steam between the end of the piston and the end of the cylinder.

The piston valve $f$ is provided with openings $g$, so that any water of condensation above the piston $f$ or within the same, which it will be noticed is formed hollow, may be allowed to escape, and for controlling this escape I provide an automatic valve consisting of the disk valve $x$ controlling the aperture leading from the valve casing $a$. The valve $x$ is arranged in a suitable casing as shown in Fig. 3, and is under pressure of a spring $z$, tending constantly to hold the valve off from its seat $z'$ so that there is an escape passage existing from the passage $y'$ of the casing $y$ through the crevice $y''$ and thence around the valve through the passage formed centrally of the casing $y$. Now when steam pressure is supplied to the upper end of the piston $f$, this will pass through the passage $y'$ and close the valve $x$ against its seat $z'$, notwithstanding the pressure of the spring $z$, but when the steam pressure to the upper end of the valve $f$ is cut off then the spring $z$ will exert its force and move the valve $x$ from its seat $z'$, thus allowing a free passage to exist between the passage $y'$, the crevice $y''$ and the passage y for the escape of any water of condensation that may be present above the valve f.

I claim as my invention:—

1. In combination with the cylinder of an engine, conduits connecting with the ends thereof, a valve casing with which said conduits connect, said conduits being in alinement with each other, a double piston valve in the said casing having a portion to extend transversely across the said conduits when in one position, a pipe leading from the steam supply to one end of the double piston valve and a pipe leading from the other end of the double piston valve to the dry steam dome, the said double piston valve operating transversely of the said conduits, one portion lying upon one side of the same and the other portion of said valve lying upon the other side of the said conduits when the valve is open, substantially as described.

2. In combination with the cylinder of the engine, conduits connecting with the ends thereof, a valve casing connected with the said conduits, a double piston valve in the said casing which in one position closes the said conduits and in another position opens the same, a pipe leading from the steam supply to one end of one piston, and a pipe leading from the other piston to the dry steam dome, one of said pistons being hollow and having an opening for the discharge of water, substantially as described.

3. In means for automatically compensating the steam pressure in locomotives, the combination of a casing $a$, a conduit $h$, $i$, flanged sockets $b$ and $c$ establishing connection between $h$ and $i$, a steam supplying conduit $d'$, a flanged socket $d$ connecting the said conduit $d'$ with the casing $a$, another flanged socket $e$, leading to the dry steam casing, a piston rod $k$, pistons $f$ and $f''$ provided on the said piston rod $k$, the said piston $f$ being hollow and having outlets $g$ for the waste-water.

In testimony whereof I affix my signature in the presence of two witnesses.

GEORG HÖHNER.

Witnesses:
HENRY HASPER,
WOLDEMAR HAUPT.